US008958472B2

(12) United States Patent
Kung et al.

(10) Patent No.: US 8,958,472 B2
(45) Date of Patent: Feb. 17, 2015

(54) METHODS AND APPARATUS FOR QUANTIZATION AND DEQUANTIZATION OF A RECTANGULAR BLOCK OF COEFFICIENTS

(75) Inventors: Wei-Ying Kung, San Diego, CA (US); Xue Fang, San Diego, CA (US); Jae Hoon Kim, Santa Clara, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 333 days.

(21) Appl. No.: 13/607,225

(22) Filed: Sep. 7, 2012

(65) Prior Publication Data

US 2013/0064290 A1 Mar. 14, 2013

Related U.S. Application Data

(60) Provisional application No. 61/532,421, filed on Sep. 8, 2011.

(51) Int. Cl.
| | |
|---|---|
| *H04N 7/30* | (2006.01) |
| *H04N 19/124* | (2014.01) |
| *H04N 19/146* | (2014.01) |
| *H04N 19/44* | (2014.01) |
| *H04N 19/12* | (2014.01) |

(Continued)

(52) U.S. Cl.
CPC ..... *H04N 19/0009* (2013.01); *H04N 19/00169* (2013.01); *H04N 19/00533* (2013.01); *H04N 19/00078* (2013.01); *H04N 19/00357* (2013.01); *H04N 19/00278* (2013.01); *H04N 19/00139* (2013.01); *H04N 19/00006* (2013.01); *H04N 7/00* (2013.01)
USPC .......................................... 375/240; 382/232

(58) Field of Classification Search
USPC .................................................... 375/240.03
See application file for complete search history.

(56) References Cited

U.S. PATENT DOCUMENTS

| | | | | |
|---|---|---|---|---|
| 7,136,531 | B2 * | 11/2006 | Satoh | 382/232 |
| 7,702,161 | B2 * | 4/2010 | Lin et al. | 382/232 |

(Continued)

OTHER PUBLICATIONS

Patent Cooperation Treaty, "PCT Search Report and Written Opinion of the International Searching Authority" for International Application No. PCT/US2012/054276 dated Mar. 6, 2013, 11 pages.

(Continued)

*Primary Examiner* — Sath V Perungavoor
*Assistant Examiner* — Howard D Brown, Jr.
(74) *Attorney, Agent, or Firm* — Young Basile Hanlon & MacFarlane P.C.

(57) ABSTRACT

A system includes an encoder that performs quantization on a rectangular block of quantized transform coefficients and a decoder that performs dequantization on a rectangular block of transform coefficients. The decoder is configured to receive a W×H block of quantized transform coefficients, wherein W is a row width of the block and H is a column height of the block. The decoder is further configured to apply dequantization processing to the W×H block of quantized transform coefficients to generate a block of transform coefficients, which are used to generate a picture corresponding to the W×H block of quantized transform coefficients. The dequantization processing comprises applying a first dequantization algorithm when an output M of a function $M=\log_2(\sqrt{W \cdot H})$ is equal to an integer value, and applying a second dequantization algorithm when the output M is equal to a non-integer value.

20 Claims, 5 Drawing Sheets

(51) Int. Cl.
*H04N 19/192* (2014.01)
*H04N 19/176* (2014.01)
*H04N 19/136* (2014.01)
*H04N 19/10* (2014.01)
*H04N 7/00* (2011.01)
*H04N 7/50* (2006.01)

(56) References Cited

U.S. PATENT DOCUMENTS

2003/0202603 A1* 10/2003 Chen et al. ............... 375/240.25
2012/0163725 A1* 6/2012 Fukuhara ..................... 382/232
2012/0250771 A1* 10/2012 Kondo ..................... 375/240.16
2013/0128959 A1* 5/2013 Lee ........................... 375/240.03
2013/0314496 A1* 11/2013 Rossato et al. .................. 348/43

OTHER PUBLICATIONS

Guo et al., "Non-Square Transform for 2NxN and Nx2N Motion Partitions" Joint Collaborative Team on Video Coding (JCT-VC) of ITU-T SB16 WP3 and ISO/IEC JTCS1/SC291WG11; 6th Meeting: Torino; Jul. 14-22, 2011; 4 pages.

* cited by examiner

METHODS AND APPARATUS FOR QUANTIZATION AND DEQUANTIZATION OF A RECTANGULAR BLOCK OF COEFFICIENTS

RELATED APPLICATIONS

The present application is related to and claims benefit under 35 U.S.C. §119(e) from the following U.S. Provisional Patent Application commonly owned with this application by Motorola Mobility, Inc.:

Ser. No. 61/532,421, filed Sep. 8, 2011, titled "Quantization for Rectangular Transform in HEVC", the entire contents of which are incorporated herein by reference.

FIELD OF THE DISCLOSURE

The present disclosure relates generally to data compression and more particularly to methods and a system for quantization and dequantization of a rectangular block of coefficients.

BACKGROUND

A growing need has arisen for higher compression of video media for various applications such as videoconferencing, digital media storage, television broadcasting, internet video streaming and communication. Video, which comprises a sequence of images or "pictures," undergoes compression during an encoding process performed by an encoder. The encoding process produces a bitstream (also referred to herein as a bit sequence), from the video, which can be stored or transmitted over a physical medium. A decoder performs a decoding process to read the bitstream and, thereby, derive the sequence of pictures of the video. As used herein, the term "coding" is used to refer to processes and algorithms used during either the encoding process or the decoding process or both, and the term coding is used interchangeably herein with the term encoding and the term decoding.

The video coding process comprises a plurality of algorithms some of which are properly arranged to achieve video compression by reducing redundant or non-important information within and between the video frames. One of these algorithms is quantization, which involves compressing ranges of transform coefficient values into individual quantum values to generate quantized transform coefficients that are used, by the encoder, to generate the bitstream of the video. The decoder dequantizes the quantized transform coefficients to recreate the video. Currently, quantization and dequantization algorithms are optimized for square blocks of coefficients e.g., transform coefficients and quantized transform coefficients, respectively.

However, there is a need for methods and apparatus for quantization and dequantization of rectangular blocks of coefficients.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
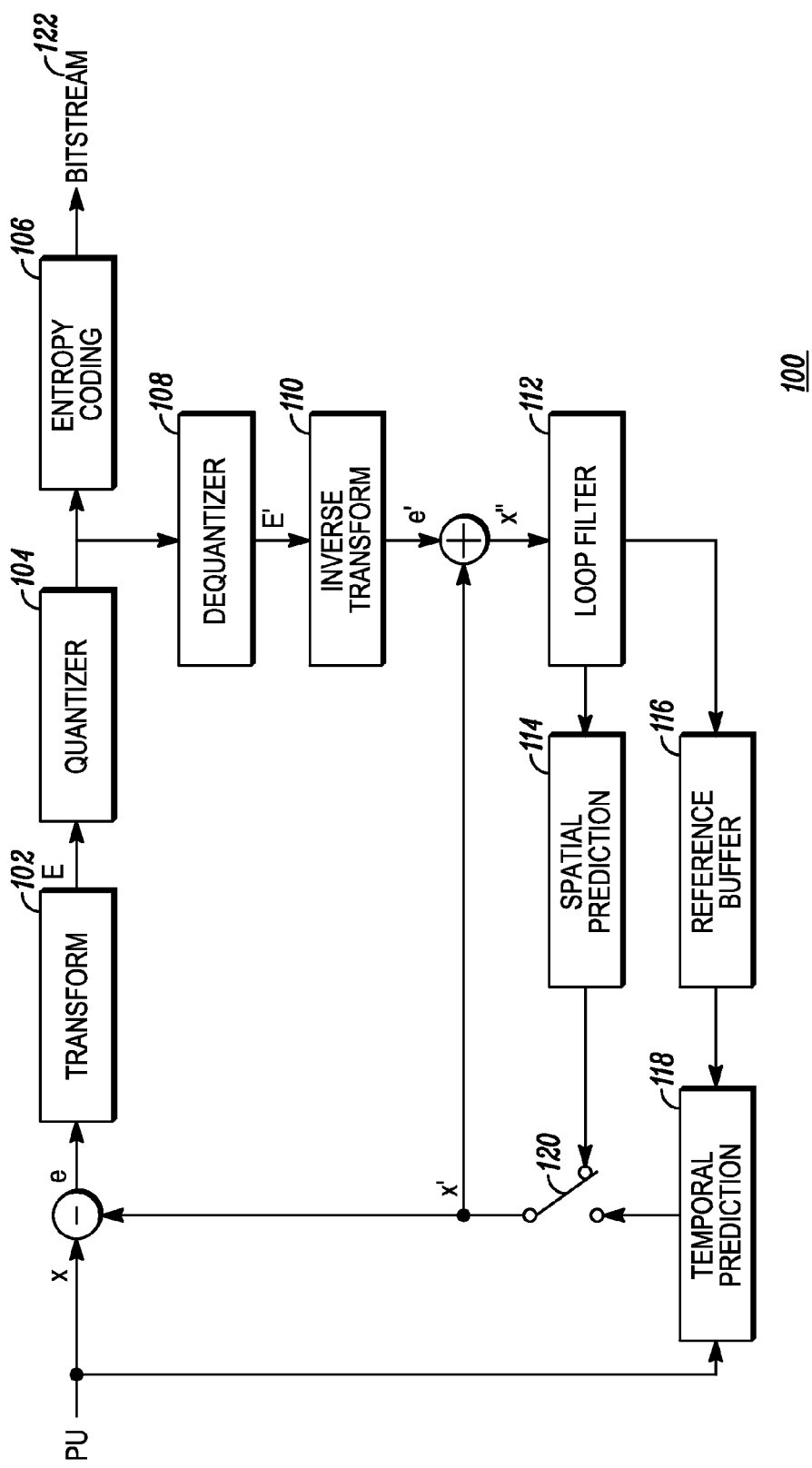
FIG. 1 is a simplified block diagram of an encoder and decoder implementing a method for quantization and dequantization of rectangular blocks of coefficients in accordance with an embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to the various embodiments, the present disclosure provides methods and apparatus for quantization and dequantization of rectangular blocks of coefficients. For example, a method for performing dequantization on a rectangular block of quantized transform coefficients includes receiving a W×H block of quantized transform coefficients, wherein W is a row width of the block and H is a column height of the block; and applying dequantization processing to the W×H block of quantized transform coefficients to generate a block of transform coefficients, which is used to generate a picture corresponding to the W×H block of quantized transform coefficients. The dequantization processing comprises applying a first dequantization algorithm when an output M of a function $M=\log_2(\sqrt{W \cdot H})$ is equal to an integer value, and applying a second dequantization algorithm when the output M is equal to a non-integer value.

A method for performing quantization on a rectangular block of transform coefficients includes receiving a W×H block of transform coefficients generated from a picture, wherein W is a row width of the block and H is a column height of the block; and applying quantization processing to the W×H block of transform coefficients to generate a block of quantized transform coefficients used to generate a bit sequence, which is used to reconstruct the picture. The quantization processing comprises applying a first quantization algorithm when an output M of a function $M=\log_2(\sqrt{W \cdot H})$ is equal to an integer value, and applying a second quantization algorithm when the output M is equal to a non-integer value. In an embodiment, the method for performing quantization further comprises determining whether to perform entropy coding of the quantized transform coefficients using the first set of constants, when the output M is equal to the integer value, otherwise determining whether to perform entropy coding of the quantized transform coefficients using the second set of constants.

A system includes a decoder having a dequantizer block and an encoder having a quantizer block. The dequantizer block is configured to receive a first W×H block of quantized transform coefficients, wherein W is a row width of the block and H is a column height of the block; and apply dequantization processing to the first block of quantized transform coefficients to generate a first block of transform coefficients, which is used to generate a first picture corresponding to the first W×H block of quantized transform coefficients. The dequantization processing comprises applying a first dequantization algorithm when an output M of a function $M=\log_2(\sqrt{W \cdot H})$ is equal to an integer value, and applying a second dequantization algorithm when the output M is equal to a non-integer value.

In an embodiment, the dequantizer block is further configured to: calculate a first set of constants using a first mapping table, while applying the first dequantization algorithm, wherein the first set of constants is used within a dequantization function to generate the first block of transform coefficients from the first block of quantized transform coefficients; and calculate a second set of constants using a second mapping table, while applying the second dequantization algorithm, wherein the second set of constants is used within the dequantization function to generate the first block of transform coefficients from the first block of quantized transform coefficients. In an alternate embodiment, the dequantizer block is further configured to: calculate a first set of constants using a first mapping table, while applying the first dequantization algorithm, wherein the first set of constants is used within a dequantization function to generate the first block of transform coefficients from the first block of quantized transform coefficients; and calculate a second set of constants using a shifted first mapping table, while applying the second dequantization algorithm, wherein the second set of constants is used within the dequantization function to generate the first block of transform coefficients from the first block of quantized transform coefficients.

The quantizer block of the system is configured to receive a second W×H block of transform coefficients generated from a second picture, wherein W is a row width of the second block of transform coefficients and H is a column height of the second block of transform coefficients; and apply quantization processing to the second block of transform coefficients to generate a second block of quantized transform coefficients used to generate a bit sequence, which is used to reconstruct the second picture. The quantization processing comprises applying a first quantization algorithm when the output M of the function $M=\log_2(\sqrt{W \cdot H})$ is equal to the integer value, and applying a second quantization algorithm when the output M is equal to the non-integer value.

Referring now to the drawings, and in particular FIG. 1, an illustrative simplified block diagram of an encoder implementing methods for quantization and dequantization of rectangular blocks of coefficients in accordance with some embodiments is shown and indicated generally at 100. Encoder 100 comprises a transform block 102, a quantizer block 104, an entropy coding block 106, a dequantizer block 108, an inverse transform block 110, a loop filter 112, a spatial prediction block 114, a reference buffer 116, a temporal prediction block 118, and a switch 120.

In an embodiment, the encoder 100 is an HEVC encoder and is, thereby configured to operate in conformance with the High Efficiency Video Coding (HEVC) draft standard (also known as H.265 and MPEG-H Part 2). For example, the encoder performs data (e.g., video data) processing in compliance with at least portions of the HEVC draft standard or a future HEVC standard not yet published (collectively referred to herein as HEVC, the HEVC standard, or the HEVC specification). However, in alternative embodiments, the encoder 100 implements data (e.g., video, audio or other media) processing that is compliant with other standard or proprietary media compression techniques. Moreover, the block diagram of the encoder 100 is "simplified" in that it only shows those blocks necessary to understand the embodiments of the present teachings. Other elements of a commercial encoder embodiment are omitted for ease of illustration.

The transform block 102, quantizer block 104, entropy coding block 106, dequantizer block 108, inverse transform block 110, spatial prediction block 114, and temporal prediction block 118 represent different algorithms used by the encoder 100 to perform its functionality, including the functionality described with respect to the present teachings, for instance as described below by reference to the remaining FIGS. 2-5. A "block" used in this context comprises a logical representation of functionality performed by a hardware device.

In one embodiment, the algorithms 102-110, 114 and 118, and the loop filter 112, reference buffer 116, and switch 120 are completely implemented in hardware on an integrated circuit chip. In an alternate embodiment, the algorithms 102-110, 114 and 118 are stored as software or firmware code on a suitable storage device (i.e., memory) and the encoder is partially implemented in hardware as a processing device that is programmed to run the algorithms stored in memory. As used herein, an "algorithm" represents all or a portion of the processing performed within a functional block, e.g., 102-110 and 114, of the encoder 100 or a decoder. However, a "function" means any equation or formula.

HEVC is a block based hybrid spatial and temporal predictive coding scheme. In HEVC, an input picture is first divided into square blocks, defined as largest coding units (LCUs). As used in this context (as related to image processing), a "block" is defined as a two-dimensional array or matrix of elements or samples such as pixels, transform coefficients, quantized transform coefficients, etc., depending on the particular type of block and the processing that the block has undergone. As such, the terms block, array, and matrix are used interchangeable herein. Unlike other video coding standards where the basic coding unit is a macroblock (MB) of 16×16 pixels, in HEVC, the basic coding unit, the CU, can be as large as 128×128 pixels, which provides greater flexibility during the encoding process to adapt compression and prediction to image peculiarities.

In HEVC, a LCU can be divided (i.e., split or partitioned) into four square blocks, defined as coding units (CUs), each a quarter size of the LCU. Each CU can be further split into four smaller CUs, each a quarter size of the CU. The splitting process can be repeated until certain criteria are met, such as depth level or rate-distortion (RD) criteria. For example, the partitioning that gives the lowest RD cost is selected as the partitioning for the LCUs. Accordingly, in HEVC, CUs define a partitioning of a picture into multiple regions, and the CU replaces the macroblock structure and contains one or several blocks defined as prediction units (PUs) and transform units (TUs), described in more detail below.

HEVC uses a quadtree data representation to describe an LCU partition, which is how the LCU is split into CUs. Specifically, at each node of the quadtree, a bit "1" is assigned if the node is further split into four sub-nodes, otherwise a bit "0" is assigned. The quadtree representation of binary data is coded along with the CUs and transmitted as overhead, to use in the decoding process. At each leaf of a quadtree, a final CU having dimensions of 2 L×2 L (where 2 L is equal to both a row width and a column height of the final CU) can possess one of four possible block dimensions, wherein block dimensions of 2 L×2 L, 2 L×L, L×2 L and L×L inside each CU pattern is defined as a prediction unit (PU). Thus, the largest PU size is equal to the CU size, and other allowed PU sizes depend on the prediction type, i.e., intra prediction or inter prediction.

A prediction unit is defined herein as the elementary unit for prediction during the coding process. At the level of CU, either intra (spatial) or inter (temporal) prediction is selected by a controller for the encoder (not shown in FIG. 1), which provides a control signal to the switch 120 (of FIG. 1) to indicate the type of prediction that was selected. The selected prediction type is then applied to all PUs within the CU. Data indicating a coding mode (i.e., intra mode or inter mode) and intra prediction direction for intra mode accompanies the video data for storage or transmission in a bitstream to a decoder. In addition, the coding mode and intra prediction direction data is accessible to the encoding (and decoding) algorithms, for example, via the controller (not shown) for the encoder.

More particularly, HEVC supports intra pictures (i.e., I pictures or frames) and inter pictures (e.g., B and P pictures or frames). Intra pictures are independently coded without reference to any other picture and, thereby, provide a possible point where decoding can begin. Hence, only spatial prediction is allowed for intra coding a CU (by coding the corresponding TUs) inside an intra picture. As used herein, intra coding (or coding in intra mode) means coding of a block using an intra (spatial) prediction algorithm (e.g., 114 of FIG. 1), wherein spatial prediction utilizes spatial correlation within a picture to reduce the amount of transmission data necessary to represent the picture. The block that is intra coded is referred to herein as an intra block. A prediction mode defines a method for generating a signal from previously encoded data, i.e., either spatial or temporal, that minimizes the residual between the prediction and the original.

By contrast, inter pictures are coded using inter prediction, which is prediction derived from data elements of reference pictures other than the current picture. Inter coding (or coding in inter mode), which is defined herein as coding of a block using a temporal (inter) prediction algorithm (e.g., 118 of FIG. 1), provides most of the video compression. This is because with inter coding only the differences between a picture and a temporal reference are coded by extracting motion information from the pictures using the temporal prediction algorithm. Temporal references are previously coded intra or inter pictures. Inter pictures support both intra and inter prediction. The block that is inter coded is referred to herein as an inter block.

As implied above, a CU can be either spatially coded (in intra mode) or temporally predictive coded (in inter mode). If a CU is coded in intra mode, each PU of the CU can have its own spatial prediction direction. If a CU is coded in inter mode, each PU of the CU can have its own motion vector(s) and associated reference picture(s). Returning again to the description of FIG. 1, HEVC encoder 100 operates, in general, as follows for implementing CU coding. In one embodiment, given a current PU block of pixels, x, corresponding to video data, a prediction PU, x', is first obtained through either spatial prediction using the spatial prediction block 114 or temporal prediction using the temporal prediction block 118, depending on the placement of the switch 120. The prediction PU is then subtracted from the current PU, resulting in a residual PU, e.

HEVC offers thirty five possible angular spatial prediction directions per PU, including, but not limited to, horizontal, vertical, 45-degree diagonal, 135-degree diagonal, DC, etc. The prediction directions have angles of +/−[0,2,5,9,13,17, 21,26,32,33,34]. Any suitable syntax can be used to indicate the spatial prediction direction per PU. Temporal prediction is performed through a motion estimation operation. The motion estimation operation searches for a best match prediction for the current PU over reference pictures generated using a decoding process (also referred to herein as a decoder) within the encoder 100 (i.e., the dequantizer 108, the inverse transform 110, and the loop filter 112) and stored in the reference buffer 116. The best match temporal prediction is described by motion vector (MV) and associated reference picture (refIdx). A PU in B picture can have up to two MVs. Both MV and refIdx, in accordance with a suitable syntax, is provided by the temporal prediction block 118.

Transform unit blocks (TUs) of pixels (corresponding to the residual PU, e, and the CU that includes the PU) undergo the operation of transform within the transform block 102, resulting in TUs in the transform domain, E, each comprising a plurality of transform coefficients corresponding to video data. In HEVC, a set of block transforms (TUs) of different sizes may be applied to a CU. More particularly, a TU can be the same size as or exceed the size of the PU but not the CU; or a PU can contain multiple TU. Moreover, the TU can be a square blocks (i.e., where the height and width of the block are equal) or a rectangular block (i.e., where the height and width of the block are not equal). The size and location of each TU within a CU is identified by a separate quadtree, called a RQT, which accompanies the coded CU for storage or transmission in a bitstream to a decoder. The data included in the RQT is accessible to the encoding (and decoding) algorithms, for example, via the controller (not shown) for the encoder.

More particularly, HEVC uses a block transform operation, which tends to decorrelate the pixels within the TU block and compact the block energy into low order transform coefficients, which are defined as scalar quantities considered to be in a frequency domain. In an embodiment, the transform block 102 performs a Discreet Cosign Transform (DCT) of the pixels within the TU block. The TU is defined herein as the block unit or block of elements processed during the transform, quantization, and entropy coding operations.

The output, E, of the transform block 102 is a transform unit block comprising a two-dimensional array or matrix (W×H) of transform coefficients, having a height H and a width W. The transform coefficients of the residual TU, E, are quantized in the quantizer block 104 to generate a transform unit block comprising a two-dimensional matrix (W×H) of quantized transform coefficients. Both the transform coefficients and the quantized transform coefficients are generally referred to herein as coefficients. Quantization plays a very important role in data compression. In HEVC, quantization converts the high precision transform coefficients into a finite number of possible values. Quantization is a lossy operation, and the loss by quantization cannot be recovered.

The quantized transform coefficients are entropy coded, resulting in a final compression bitstream 122 (also referred to herein as a one-dimensional "bit sequence") from the encoder 100. In HEVC, entropy coding is performed using context-adaptive binary-arithmetic coding (CABAC). Other video compression techniques use CABAC as well as other entropy coding algorithms such as context-adaptive variable-length coding (CAVLC). When a video compression technique offers both CAVLC and CABAC, it can be said that an encoder (or decoder) that can implement both of these entropy coding techniques operates in accordance with two configurations: a low complexity configuration, when implementing CAVLC entropy coding and a high efficiency configuration when implementing CABAC entropy coding.

In the decoding process within encoder 100, the quantized transform coefficients of the residual TU are dequantized in the dequantizer block 108 (an inverse (but not exactly) operation of the quantizer block 104), resulting in dequantized transform coefficients of the residual TU, E'. The dequantized transform coefficients of the residual TU, E', are inverse transformed in the inverse transform block 110 (an inverse of the transform block 102), resulting in a reconstructed residual TU, e'. The reconstructed residual TU, e', is then added to the corresponding prediction, x', either spatial or temporal, to form a reconstructed PU, x". In HEVC, the adaptive loop filter 112 is performed over the reconstructed LCU, which smoothes the block boundaries and minimizes the coding distortion between the input and output pictures. If the reconstructed pictures are reference pictures, they are stored as temporal references in the reference buffer 116 for future temporal prediction.

An external decoder (not shown) comprises an entropy decoding block, which performs the inverse algorithm of the entropy encoding block 106 of the encoder, thereby receiving a bit stream and generating a block (TU) of quantized transform coefficients. The decoder further includes the same elements as those that perform the decoding process within the encoder 100; and these elements receive the quantized transform coefficients from the entropy decoding block and generate the corresponding pictures of video. Namely, the decoding process within the decoder further includes the dequantizer 108, the inverse transform 110, the loop filter 112, the spatial prediction block 114, the reference buffer 116, the temporal prediction block 118, and the switch 120 that operate as described above.

Figure 2:
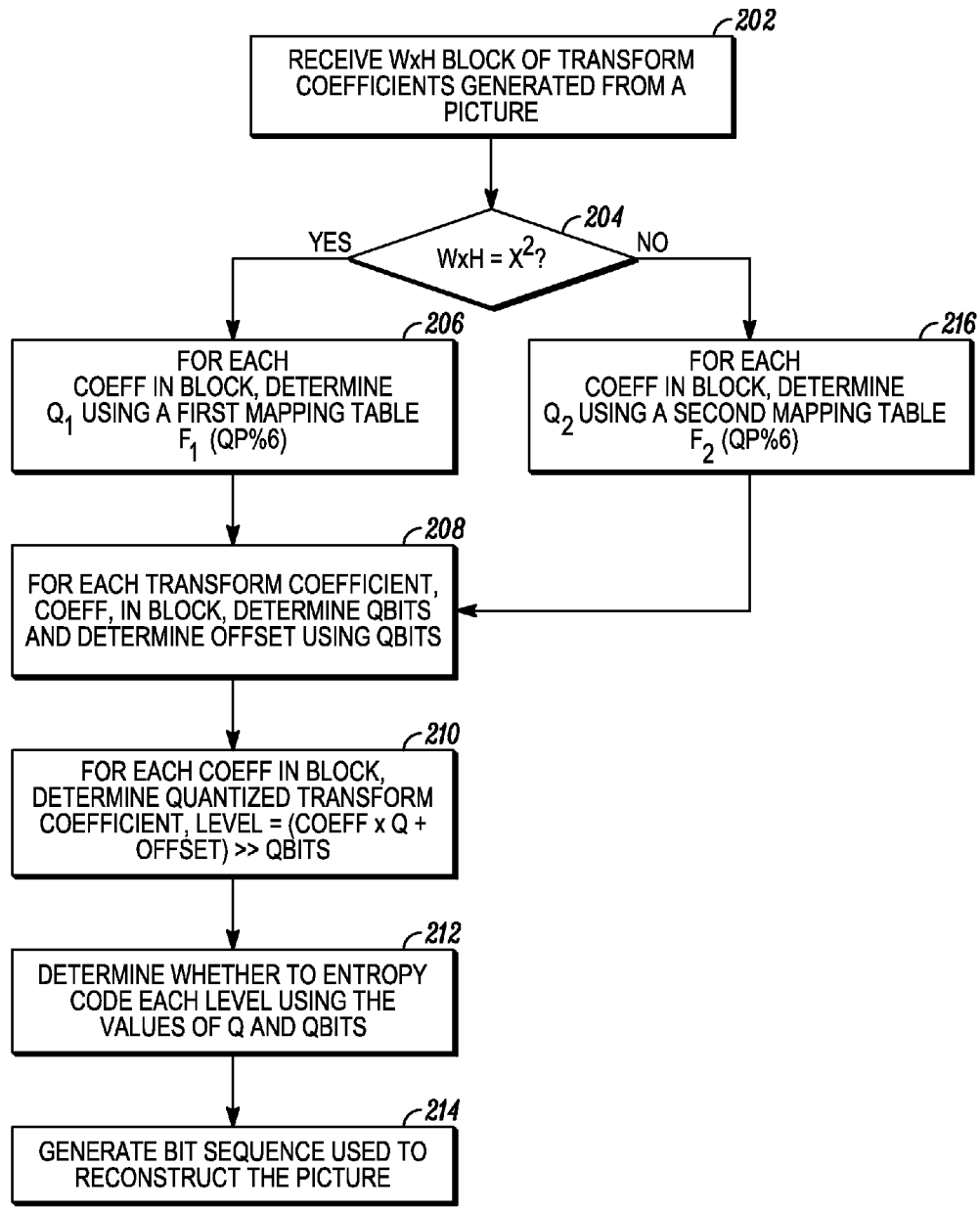
FIG. 2 is a flowchart of a method for quantization of rectangular blocks of transform coefficients in accordance with an embodiment.
Figure 3:
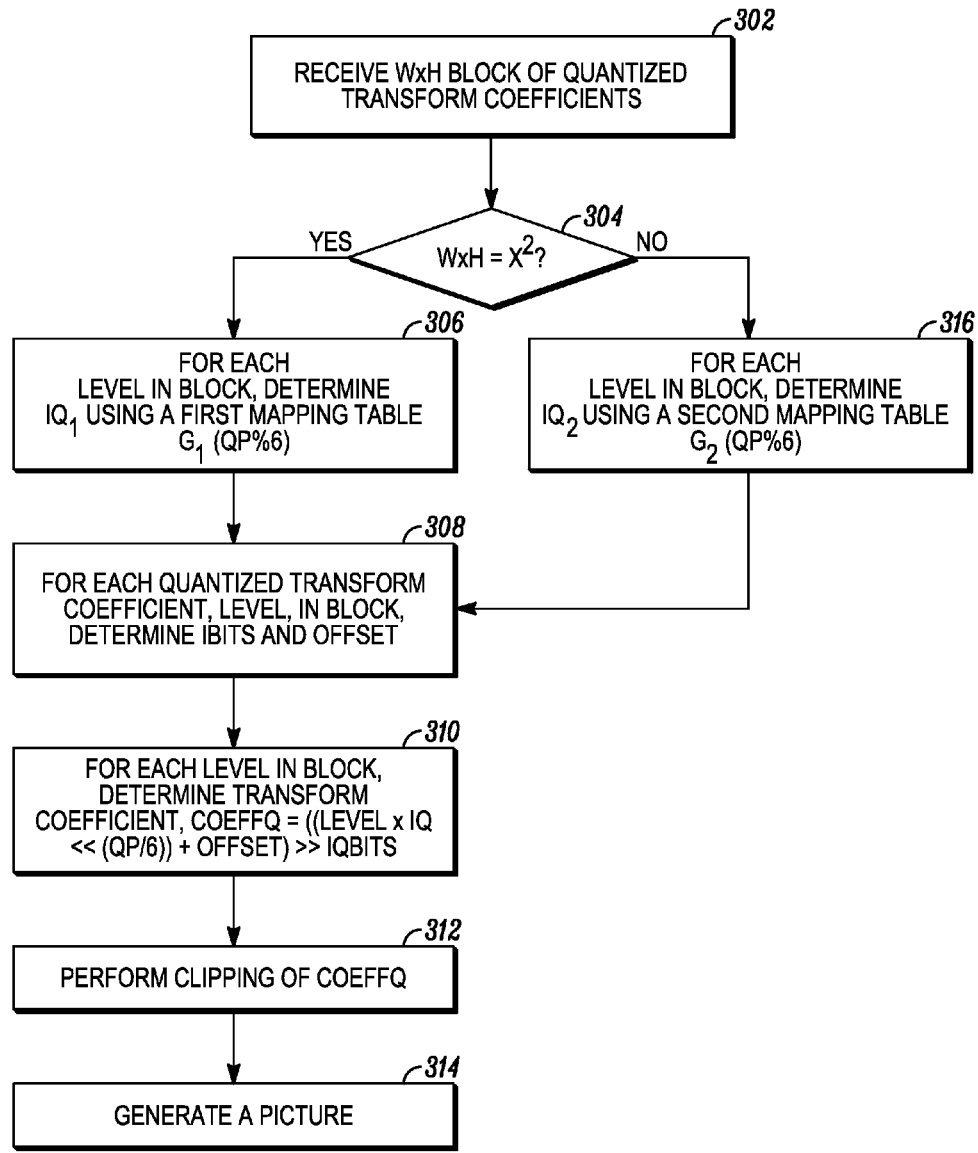
FIG. 3 is a flowchart of a method for dequantization of rectangular blocks of quantized transform coefficients in accordance with an embodiment.
Figure 4:
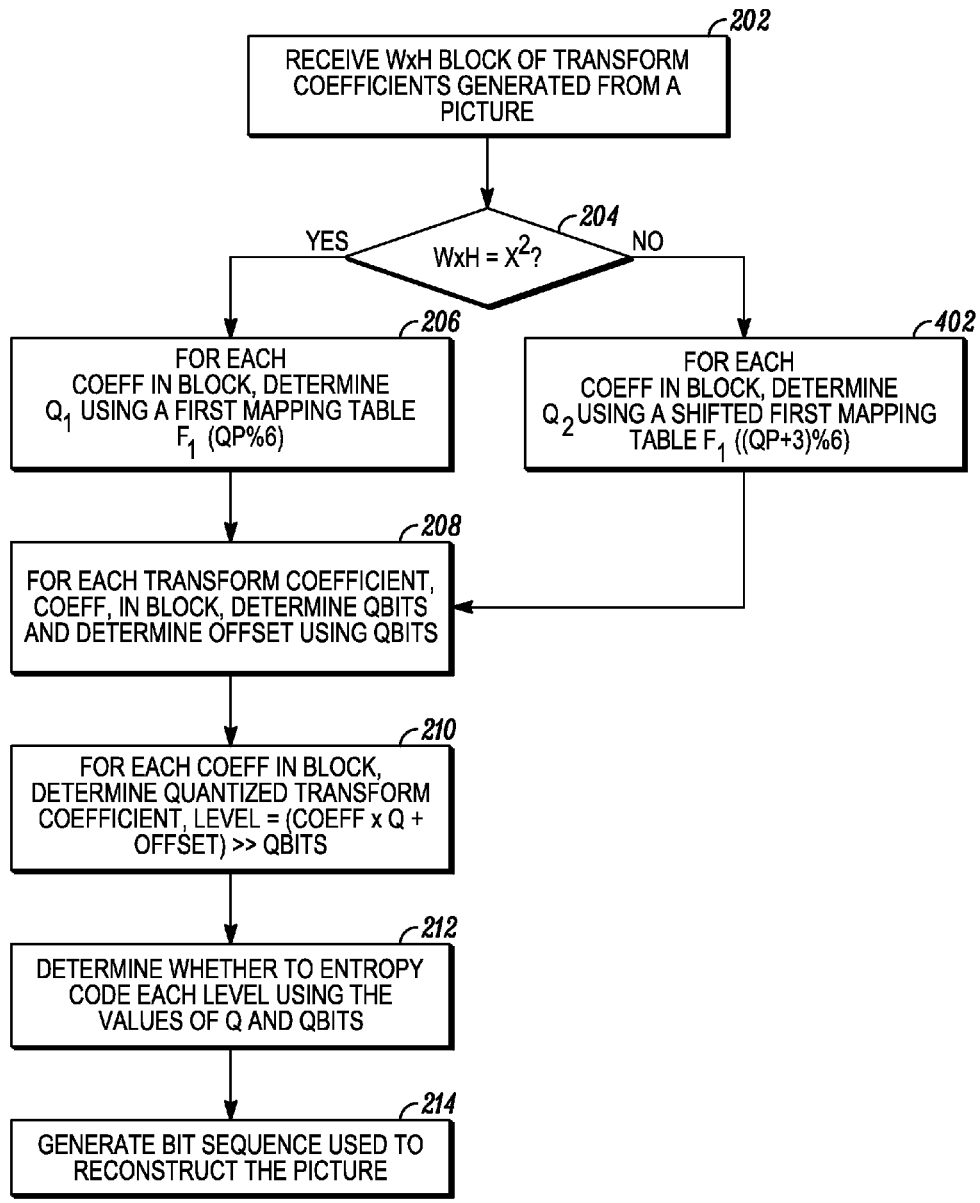
FIG. 4 is a flowchart of a method for quantization of rectangular blocks of transform coefficients in accordance with an embodiment.
Figure 5:
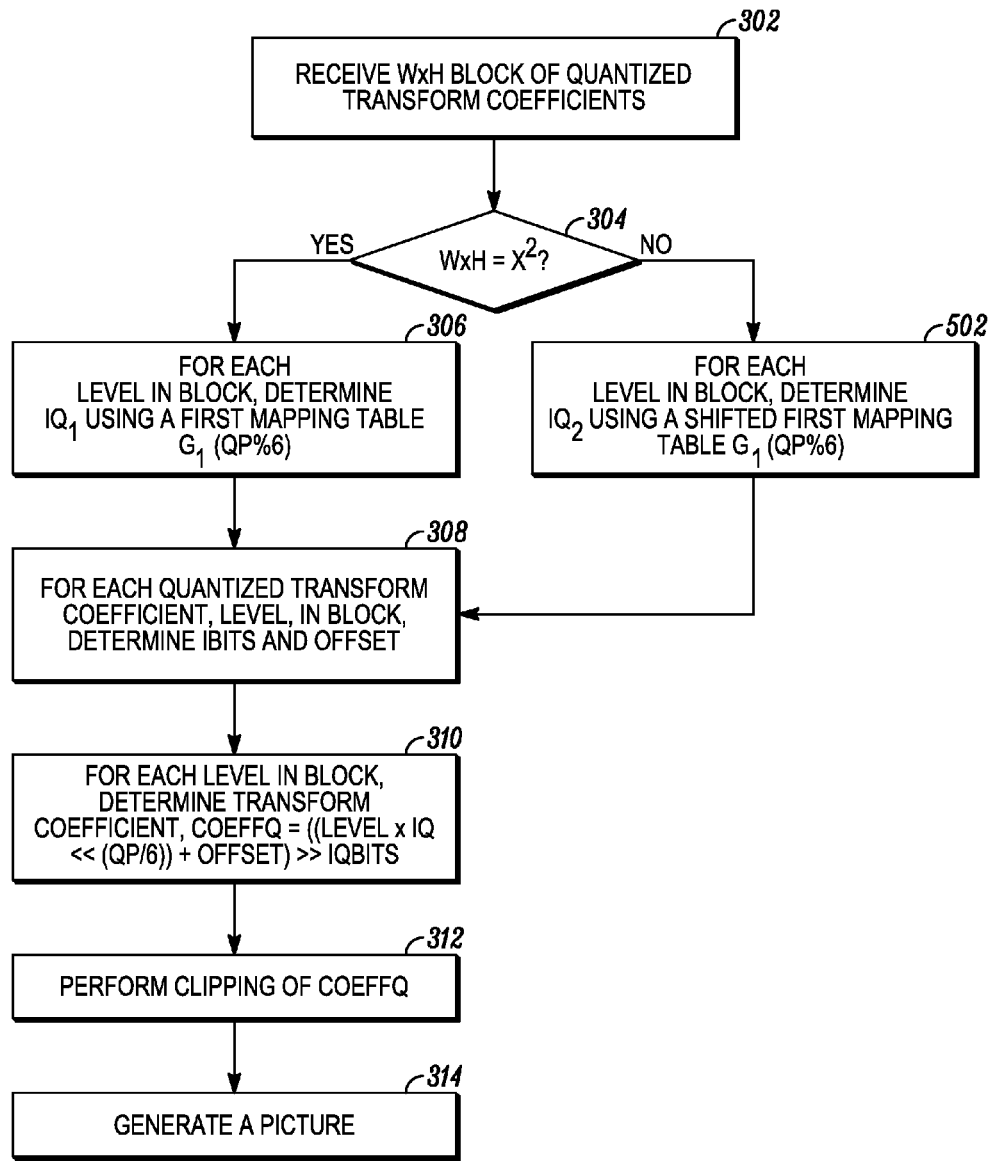
FIG. 5 is a flowchart of a method for dequantization of rectangular blocks of quantized transform coefficients in accordance with an embodiment.

The remaining FIGS. 2-5 illustrate various embodiments of the present disclosure. More particularly, FIGS. 2 and 4 illustrate methods 200 and 400, respectively, for quantization of rectangular blocks of transform coefficients, in accordance with some embodiments. For instance, encoder 100 performs at least some of the functionality of the methods 200 and 400 in the quantizer block 104. Thus, the quantizer block is configured to perform processing as indicated by reference to FIGS. 2 and 4. FIGS. 3 and 5 illustrate methods 300 and 500, respectively, for dequantization of rectangular blocks of quantized transform coefficients, in accordance with some embodiments. For instance, a decoder (either within or external to the encoder 100) performs at least some of the functionality of the methods 300 and 500 in the dequantizer block 108. Thus, the dequantizer block is configured to perform processing as indicated by reference to FIGS. 3 and 5.

Methods 200-500 are described below for implementing with HEVC, wherein the encoder and decoder are configured to operate in conformance with the High Efficiency Video Coding standard. Thus, the functions (equations) and mapping tables described herein are optimized for HEVC. However, in other embodiments, methods 200-500 can be implemented with a different video compression standard or with a proprietary video compression technique. Accordingly, the functions and the mapping tables described herein may vary depending, at least in part, on the particular video compression technique being used.

Turning now to the details of method 200 as performed in the encoder 100. At 202, the quantizer block 104 receives a W×H block of transform coefficients generated from a picture, wherein W is a row width of the block and H is a column height of the block. W and H can be any positive value, but in one embodiment, both W and H are positive integers. The quantizer block is operative to apply quantization processing to the W×H block, in accordance with the present teachings, to generate a block of quantized transform coefficients used to generate a bit sequence, which is used to reconstruct the picture.

Depending on the size of the block (i.e., the values of W and H), the quantizer block decides, at 204, whether to apply a first quantization algorithm (that follows the "YES" branch) or a second quantization algorithm (that follows the "NO" branch). In one embodiment, when $W \times H = X^2$ with an integer X or an output M of a function $M = \log_2(\sqrt{W \cdot H})$ is equal to an integer value (i.e., a whole number), the encoder applies the first quantization algorithm. Thus, the first quantization algorithm is applied to all square TU blocks and some rectangular blocks that meet the above criterion.

Otherwise, when $W \times H \neq X^2$ or $M = \log_2(\sqrt{W \cdot H})$ is equal to a non-integer value (such as in HEVC where $W \times H = 2X^2$), the encoder applies the second quantization algorithm. In contrast to the first quantization algorithm, the second quantization algorithm applies only to rectangular blocks. This selection between multiple quantization algorithms is novel. Conventionally, a single quantization algorithm was applied to each block of transform coefficients, and the algorithm was optimized for square TUs.

In general, in the embodiment illustrated with respect to FIG. 2, applying the first quantization algorithm comprises using a first mapping table to calculate a first set of constants used to generate the block of quantized transform coefficients, and applying the second quantization algorithm comprises using a second mapping table to calculate a second set of constants used to generate the block of quantized transform coefficients. A mapping table, as defined herein, is a table of values: that is used in the calculation of a constant Q from a selected quantization parameter for a given transform coefficient being processed; or that is used in the calculation of a constant IQ from a decoded quantization parameter for a given quantized transform coefficient being processed. A "shifted" mapping table refers to the same mapping table used in a pair of Q calculation functions or a pair of IQ calculation functions, wherein one of the functions in the pair contains an operation that shifts the output values of the other function in the pair, as described in more detail below.

More particularly, the block of quantized transform coefficients is generated using quantization function (1) below applied to each transform coefficient in the block. Instead of an expensive division or multiplication operation, it is preferred and widely accepted to use a right or left shift (noted as >> or <<, respectively) by a number of bits, n, which corresponds to the division or multiplication by $2^n$, respectively.

Quantization function (1) is defined as $$\text{level} = (\text{coeff} * Q + \text{offset}) \gg \text{Qbits}, \quad (1)$$

where coeff is a given transform coefficient, from the W×H block transform coefficients, which is input to the quantization function (1);

level is a corresponding quantized transform coefficient that is output from the quantization function (1);

Q is a constant obtained from the first mapping table when the output M is equal to the integer value, otherwise Q is obtained by the second mapping table;

Qbits is a is a calculable constant comprising a number of bits used in performing a right shift that represents a division operation within the quantization function;

offset is a calculable constant that is derived using the value of Qbits.

In applying the first quantization algorithm (illustrated by reference to the "YES" branch of decision block 204), the encoder processes (at 206-208) each transform coefficient, i.e., coeff, in the block in a sequence to determine (at 210) a corresponding quantized transform coefficient (at 210), i.e., level, using function (1). For simplicity in explaining the quantization processing, only the processing of a "first" transform coefficient is described. However, similar processing is performed on the remaining transform coefficients within the block.

More particularly, at 206 and 208, the quantizer calculates all of the variables, such as Q, Qbits and Offset, needed as inputs to function (1), for the first transform coefficient. Namely, at 206, the quantizer calculates Q. In this case, $Q=Q_1$, since $W \times H = X^2$. $Q_1$ is calculated using a first mapping table (2) as;

$$Q = f1(QP \% 6), \text{ i.e., a modulo operation,} \quad (2)$$

wherein f1(x=0,1,2,3,4,5)={26214,23302,20560,18396, 16384,14564}. Thus, in this case (where $W \times H = X^2$) the first set of constants Q is determined based on this first mapping table, for use in quantizing the W×H block of transform coefficients.

At 208, the quantizer calculates Qbits, calculates offset using Qbits, and uses QP for the first transform coefficient, coeff, currently being processed. In an embodiment, the quantization parameter QP is predetermined either by an input configuration file or determined by the encoder based on certain rules such as rate distortion optimization or rate control mechanism. QP is encoded into the bit stream generated as part of the encoding process. Qbits and offset are calculated, determined or obtained using the following functions/equations (3) and (4), respectively:

$$\text{Qbits} = (21 + QP/6 - \text{IntegerM} - DB + \text{RoundingShift}), \quad (3)$$

where
DB=B−8 (an internal bit-depth increase with 8-bit input); $M = \log_2(\sqrt{W \cdot H})$;
IntegerM=Ceil(M), wherein Ceil(M) is the closest and largest integer value to $\log_2(\sqrt{W \cdot H})$ and where IntegerM=M for $W \times H = X^2$ or $M = \log_2(\sqrt{W \cdot H})$ is equal to an integer value;
RoundingShift=0 when IntegerM=M, otherwise RoundingShift=(QP % 6+3)/6 where IntegerM=M−0.5 (in an HEVC implementation); and
B=source bit width (for instance, 8 or 10);

$$\text{offset} = 1 << (\text{Qbits} - 1). \quad (4)$$

As mentioned above, once Qbits, $Q_1$, and offset are determined, the quantizer uses quantization function (1) to determine (at 210) the corresponding first quantized transform coefficient. When the block W×H of quantized transform coefficients is determined, it is entropy coded, resulting in a final compression bitstream 122, at 214, that is stored or provided to a decoder. In one embodiment that is compatible with HEVC, the encoder uses a feature called Rate Distortion Optimized Quantization (RDOQ). When RDOQ is enabled, the encoder determines (at 212) whether or not to entropy code each quantized transform coefficient by comparing the cost of coding the level to the cost of leaving the level uncoded. More particularly, the encoder determines whether to perform entropy coding of the first quantized transform coefficient, level, using the values $Q_1$ and Qbits (when $W \times H = X^2$) and using the following functions (5), (6), (7), (8), and (9):

$$\text{UncodedCost} = \text{uncodedError}^2 \cdot \text{errScale}, \quad (5)$$

$$\text{CodedCost} = \text{codedError}^2 \cdot \text{errScale} + \text{rateCost}, \quad (6)$$

$$\text{where uncodedError} = \text{coeff} \times Q, \quad (7)$$

$$\text{codedError} = \text{coeff} \times Q - (\text{level} << \text{Qbits}), \quad (8)$$

$$\text{errScale} = \frac{2^{15} \cdot 2^{-2 \cdot (15 - B - M)}}{Q^2 \cdot 2^{2 \cdot DB}} \quad (9)$$

If UncodedCost>CodedCost, the level is coded. Otherwise, the level is left uncoded.

Turning back to decision function 204, where $W \times H \neq X^2$ or $M = \log_2(\sqrt{W \cdot H})$ is equal to a non-integer, the encoder performs the second quantization algorithm as illustrated by reference to the blocks 216 and 208-214 of method 200. In the HEVC encoder configuration, the second quantization algorithm is applied when $W \times H = 2X^2$ (e.g., with rectangular-sized TUs of L×2 L and 2 L×L). In applying the second quantization algorithm, the encoder processes each transform coefficient, i.e., coeff, in the block in a sequence to determine a corresponding quantized transform coefficient, i.e., level, using quantization function (1). For simplicity in explaining the quantization processing, only the processing of a "first" transform coefficient is described. However, similar processing is performed on the remaining transform coefficients within the block.

More particularly, at 216, the quantizer calculates Q. In this case, $Q=Q_2$ (since $W \times H \neq X^2$), which is calculated using a second mapping table (10) as:

$$Q = f2(QP \% 6) \quad (10)$$

where f2(x=0,1,2,3,4,5)={18536,16477,14538,13007, 11585,10298}, in an HEVC embodiment. Thus, in this case (where $W \times H \neq X^2$) the second set of constants Q is determined based on this second mapping table, for use in quantizing the W×H block of transform coefficients. The method 200 then proceeds to perform the functionality of blocks 208-214, as described above, to generate the bit sequence corresponding to the W×H block of transform coefficients.

Turning now to the details of method 300 of FIG. 3 as performed in the decoder. At 302, the dequantizer block (e.g., 104) receives a W×H block of quantized transform coefficients, wherein W is a row width of the block and H is a column height of the block. W and H can be any positive value, but in one embodiment, both W and H are positive integers. The dequantizer block is operative to apply dequantization processing to the W×H block, in accordance with the present teachings, to generate a block of (dequantized) transform coefficients used to generate a picture corresponding to the W×H block of quantized transform coefficients.

Depending on the size of the block (i.e., the values of W and H), the dequantizer block decides, at 304, whether to apply a first dequantization algorithm (that follows the "YES" branch) or a second dequantization algorithm (that follows the "NO" branch). In one embodiment, when $W \times H = X^2$ with an integer X or an output M of a function $M = \log_2(\sqrt{W \cdot H})$ is equal to an integer value (i.e., a whole number), the decoder applies the first dequantization algorithm. Thus, the first dequantization algorithm is applied to all square TU blocks and some rectangular blocks that meet the above criterion.

Otherwise, when $W \times H \neq X^2$ or $M = \log_2(\sqrt{W \cdot H})$ is equal to a non-integer value (such as in HEVC where $W \times H = 2X^2$), the decoder applies the second dequantization algorithm. In contrast to the first dequantization algorithm, the second dequantization algorithm applies only to rectangular blocks. This selection between multiple dequantization algorithms is novel. Conventionally, a single dequantization algorithm was applied to each block of quantized transform coefficients, and the algorithm was optimized for square TUs.

In general, in the embodiment illustrated with respect to FIG. 3, applying the first dequantization algorithm comprises using a first mapping table to calculate a first set of constants used to generate the block of transform coefficients, and applying the second dequantization algorithm comprises using a second mapping table to calculate a second set of constants used to generate the block of transform coefficients. More particularly, the block of transform coefficients is generated using dequantization function (11) below:

$$\text{coeffQ} = ((\text{level} \times IQ << (QP/6)) + \text{offset}) >> \text{IQbits}, \quad (11)$$

level is a first quantized transform coefficient, from the W×H block of quantized transform coefficients, which is input to the dequantization function (11);

coeffQ is a corresponding first transform coefficient that is output from the dequantization function (11);

IQ is a constant obtained from the first mapping table when the output M is equal to the integer value, otherwise IQ is obtained from the second mapping table;

QP is a decoded quantization parameter;

IQbits is a calculable constant comprising a number of bits used in performing a right shift within the first function;

offset is a calculable constant derived from IQBits or W×H.

In applying the first dequantization algorithm (illustrated by reference to the "YES" branch of decision block 304), the decoder processes (at 306-308) each quantized transform coefficient, i.e., level, in the block in a sequence to determine (at 310) a corresponding transform coefficient, i.e., coeffQ, using function (11). For simplicity in explaining the dequantization processing, only the processing of a "first" quantized transform coefficient is described. However, similar processing is performed on the remaining quantized transform coefficients within the block.

More particularly, at 306 and 308, the dequantizer calculates all of the variables needed as inputs to function (11), such as IQ, offset, and IQbits, for the first quantized transform coefficient. Namely, at 306, the dequantizer calculates IQ. In this case, $IQ=IQ_1$, since W×H=X². $IQ_1$ is calculated using a first mapping table (12) as;

$$IQ = g1(QP \%6), \text{ i.e., a modulo operation}, \quad (12)$$

wherein g1(x=0,1,2,3,4,5)={40,45,51,57,64,72}. Thus, in this case (where W×H=X²) the first set of constants IQ is determined based on this first mapping table, for use in dequantizing the W×H block of quantized transform coefficients.

At 308, the dequantizer calculates IQbits and offset and decodes QP for the first quantized transform coefficient, level, currently being processed, wherein QP is a quantization parameter selected by the encoder for the first quantized transform coefficient. While applying the first dequantization algorithm, IQbits and offset is calculated using the following functions (13) and (14), respectively, $$\text{IQbits} = (\text{IntegerM} - 1 + DB - \text{RoundingShift}), \quad (13)$$

where
DB=B−8 (an internal bit-depth increase with 8-bit input);
B=source bit width;
$M = \log_2(\sqrt{W \cdot H})$;
IntegerM=Ceil(M), wherein Ceil(M) is the closest and largest integer value to $\log_2(\sqrt{W \cdot H})$, and where IntegerM=M for W×H=X² or $M=\log_2(\sqrt{W \cdot H})$ is equal to an integer value;
RoundingShift=0 when IntegerM=m, otherwise RoundingShift=(QP %6+3)/6 where IntegerM=M×0.5 (in an HEVC implementation);

$$\text{offset} = 1 << (\text{IntegerM} - 2 + DB). \quad (14)$$

As mentioned above, once IQbits, IQ, and offset are determined, the dequantizer uses dequantization function (11) to determine (at 310) the corresponding first transform coefficient. In an embodiment, this dequantized transform coefficient undergoes a clipping (312) function, wherein it is shortened to the range of (−3268,32768) in accordance with the following function (15):

$$\text{coeffQ} = \min(32767, \max(-32768, \text{coeffQ}). \quad (15)$$

The block of dequantized transform coefficients is then used by the decoder to generate a corresponding picture, at 314.

Turning back to decision function 304, where W×H≠X² or $M = \log_2(\sqrt{W \cdot H})$ is equal to a non-integer value, the decoder performs the second dequantization algorithm as illustrated by reference to the blocks 316 and 308-314 of method 300. In the HEVC decoder configuration, the second dequantization algorithm is applied when W×H=2X² (e.g., with rectangular-sized TUs of L×2 L and 2 L×L). In applying the second dequantization algorithm, the decoder processes each quantized transform coefficient, i.e., level, in the block in a sequence to determine a corresponding (dequantized) transform coefficient, i.e., coeffQ, using dequantization function (11). For simplicity in explaining the dequantization processing, only the processing of a "first" quantized transform coefficient is described. However, similar processing is performed on the remaining quantized transform coefficients within the block.

More particularly, at 316, the dequantizer calculates IQ. In this case, IQ=IQ2 (since W×H≠X²), which is calculated using a second mapping table (16) as:

$$IQ = g2(QP \%6), \quad (16)$$

where g2(x=0,1,2,3,4,5)={56,63,72,80,90,101} in an HEVC embodiment. Thus, in this case (where W×H≠X²) the second set of constants IQ is determined based on this second mapping table, for use in dequantizing the W×H block of quantized transform coefficients. The method 300 then proceeds to perform the functionality of blocks 308-314, as described above, to generate the picture corresponding to the W×H block of transform coefficients.

Turning now to the details of method 400 of FIG. 4 as performed in the encoder 100. Method 400 is similar to method 200 performed in the encoder and comprises similar blocks 202-214, which are described above but not repeated here for the sake of brevity. Accordingly, in this embodiment the first quantization algorithm applied during the "YES" branch of decision block 204 is the same in method 200 and 400. However, the second quantization algorithm performed at the "NO" decision branch of block 204 (starting with block 402) is different in method 400.

In general, in the embodiment illustrated with respect to FIG. 4, applying the first quantization algorithm comprises using a first mapping table to calculate a first set of constants (Q) used to generate the block of quantized transform coefficients, and applying the second quantization algorithm comprises using a shifted first mapping table to calculate a second set of constants (Q) used to generate the block of quantized transform coefficients. More particularly, when W×H=X², $Q=Q_1$ is calculated as above using the first mapping table Q=f(QP %6), where f(x=0,1,2,3,4,5)={26214, 23302,20560,18396,16384,14564}. On the other hand, at 402, $Q=Q_2$ (since W×H≠X²), which is calculated using a shifted first mapping table as defined below:

$$Q = f1((QP+3)\%6), \quad (17)$$

where f(x=0,1,2,3,4,5)={26214,23302,20560,18396,16384, 14564}. Thus, in this case (where W×H≠X²) the second set of constants Q is determined based on a shifted first mapping table, for use in quantizing the W×H block of transform coefficients.

Turning now to the details of method 500 of FIG. 5 as performed in the decoder. Method 500 is similar to method 300 performed in the decoder and comprises similar block 302-314, which are described above but not repeated here for the sake of brevity. Accordingly, in this embodiment, the first dequantization algorithm applied during the "YES" branch of decision block 304 is the same in methods 300 and 400. However, the second dequantization algorithm performed at the "NO" decision branch of block 304 (starting with block 502) is different in method 500.

In general, in the embodiment illustrated with respect to FIG. 5, applying the first dequantization algorithm comprises using a first mapping table to calculate a first set of constants (IQ) used to generate the block of (dequantized) transform coefficients, and applying the second dequantization algorithm comprises using a shifted first mapping table to calculate a second set of constants (IQ) used to generate the block of transform coefficients. More particularly, as stated above, where W×H=$X_2$, IQ=$IQ_1$, is calculated as above using the first mapping table IQ=g1(QP %6), where g1(x=0,1,2,3,4,5)={40,45,51,57,64,72}. However, in this case, at 502, IQ=IQ2 (since W×H≠$X^2$), which is calculated using a shifted version of the first mapping table. Accordingly, where M=IntegerM−0.5, as in HEVC, the shifted mapping table is as follows:

$$IQ=g1((QP+3)\%6), \quad (18)$$

where g1(x=0,1,2,3,4,5)={40,45,51,57,64,72}. Thus, in this case (where W×H≠$X^2$) the second set of constants IQ is determined based on a shifted first mapping table, for use in dequantizing the W×H block of quantized transform coefficients. Moreover, in an HEVC embodiment, offset used to determine the transform coefficients is determined using function (19) as follows:

$$\text{offset}=1<<(\text{IQbits}-1). \quad (19)$$

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In general, for purposes of these teachings, devices are configured or adapted with functionality in accordance with embodiments of the present disclosure as described in detail above with respect to the FIGS. 2-5. "Adapted," "configured," "operable" or "capable of" as used herein means that the indicated devices are implemented using hardware or a combination of hardware and processing devices programmed with software and/or firmware to perform the desired functionality.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure.

This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for performing dequantization on a rectangular block of quantized transform coefficients, the method comprising:
    receiving a W×H block of quantized transform coefficients, wherein W is a row width of the block and H is a column height of the block;
    applying dequantization processing to the W×H block of quantized transform coefficients to generate a block of transform coefficients, which is used to generate a picture corresponding to the W×H block of quantized transform coefficients, wherein the dequantization processing comprises applying a first dequantization algorithm when an output M of a function $M=\log_2(\sqrt{W \cdot H})$ is equal to an integer value, and applying a second dequantization algorithm when the output M is equal to a non-integer value.

2. The method of claim 1, wherein applying the first dequantization algorithm comprises using a first mapping table to calculate a first set of constants used to generate the block of transform coefficients, and applying the second dequantization algorithm comprises using a second mapping table to calculate a second set of constants used to generate the block of transform coefficients.

3. The method of claim 1 wherein applying the first dequantization algorithm comprises using a first mapping table to calculate a first set of constants used to generate the block of transform coefficients, and applying the second dequantization algorithm comprises using a shifted first mapping table to calculate a second set of constants used to generate the block of transform coefficients.

4. The method of claim 1, wherein the second dequantization algorithm is applied when $W \times H = 2X^2$.

5. The method of claim 2, wherein the block of transform coefficients is generated using dequantization function, coeffQ=((level×IQ<<(QP/6))+offset)>>IQbits, wherein:
    level is a quantized transform coefficient, from the W×H block of quantized transform coefficients, which is input into the dequantization function;
    coeffQ is a corresponding transform coefficient that is output from the dequantization function;
    IQ is constant obtained from the first mapping table when the output M is equal to the integer value, otherwise IQ is obtained from the second mapping table;
    QP is a decoded quantization parameter;
    IQbits is a calculable constant comprising a number of bits used in performing a right shift within the dequantization function;
    offset is a calculable constant derived from IQBits.

6. The method of claim 5, wherein:
    the first mapping table comprises IQ=g(QP %6), wherein g(x=0,1,2,3,4,5)={40,45,51,57,64,72}; and
    the shifted first mapping table comprises IQ=g((QP+3) %6), wherein g(x=0,1,2,3,4,5)={40,45,51,57,64,72}, and wherein QP is a decoded quantization parameter.

7. The method of claim 3, wherein:
    the first mapping table comprises IQ=g1(QP %6), wherein g1(x=0,1,2,3,4,5)={40,45,51,57,64,72}; and
    the second mapping table comprises IQ=g2(QP %6), wherein g2(x=0,1,2,3,4,5)={56,63,72,80,90,101}.

8. A method for performing quantization on a rectangular block of transform coefficients, the method comprising:
    receiving a W×H block of transform coefficients generated from a picture, wherein W is a row width of the block and H is a column height of the block;
    applying quantization processing to the W×H block of transform coefficients to generate a block of quantized transform coefficients used to generate a bit sequence, which is used to reconstruct the picture, wherein the quantization processing comprises applying a first quantization algorithm when an output M of a function $M=\log_2(\sqrt{W \cdot H})$ is equal to an integer value, and applying a second quantization algorithm when the output M is equal to a non-integer value.

9. The method of claim 8, wherein applying the first quantization algorithm comprises using a first mapping table to calculate a first set of constants used to generate the block of quantized transform coefficients, and applying the second quantization algorithm comprises using a second mapping table to calculate a second set of constants used to generate the block of quantized transform coefficients.

10. The method of claim 9, wherein the block of quantized transform coefficients is generated using quantization function, level=(coeff×Q+offset)>>Qbits, wherein:
    coeff is a transform coefficient, from the W×H block transform coefficients, which is input into the quantization function;
    level is a corresponding quantized transform coefficient that is output from the quantization function;
    Q is a constant obtained from the first mapping table when the output M is equal to the integer value, otherwise Q is obtained from the second mapping table;
    Qbits is a calculable constant comprising a number of bits used in performing a right shift that represents a division operation within the quantization function;
    offset is a calculable constant that is derived using Qbits.

11. The method of claim 10, wherein:
    the first mapping table comprises Q1=f1(QP %6), wherein f1(x=0,1,2,3,4,5)={26214,23302,20560,18396,16384, 14564}; and
    the second mapping table comprises Q2=f2(QP %6), wherein f2(x=0,1,2,3,4,5)={18536,16477,14538, 13007,11585,10298}, and wherein QP is a predetermined quantization parameter.

12. The method of claim 10 further comprising determining whether to perform entropy coding of the quantized transform coefficients using the first set of constants, when the output M is equal to the integer value, otherwise determining whether to perform entropy coding of the quantized transform coefficients using the second set of constants.

13. The method of claim 8, wherein applying the first quantization algorithm comprises using a first mapping table to calculate a first set of constants used to generate the block of quantized transform coefficients, and applying the second quantization algorithm comprises using a shifted first mapping table to calculate a second set of constants used to generate the block of quantized transform coefficients.

14. The method of claim 13, wherein:
    the first mapping table comprises Q1=f(QP %6), wherein f(x=0,1,2,3,4,5)={26214,23302,20560,18396,16384, 14564}; and
    the shifted first mapping table comprises Q2=f ((QP+3) %6), wherein f(x=0,1,2,3,4,5)={26214,23302,20560, 18396,16384,14564}, and wherein QP is a selected quantization parameter.

15. The method of claim 8, wherein the second quantization algorithm is applied when W×H=2X$^2$.

16. A system comprising:
a decoder having a dequantizer block that is configured to:
  receive a first W×H block of quantized transform coefficients, wherein W is a row width of the block and H is a column height of the block;
  apply dequantization processing to the first block of quantized transform coefficients to generate a first block of transform coefficients, which is used to generate a first picture corresponding to the first W×H block of quantized transform coefficients, wherein the dequantization processing comprises applying a first dequantization algorithm when an output M of a function M=log$_2$ ($\sqrt{W \cdot H}$) is equal to an integer value, and applying a second dequantization algorithm when the output M is equal to a non-integer value.

17. The system of claim 16, wherein the dequantizer block is further configured to:
  calculate a first set of constants using a first mapping table, while applying the first dequantization algorithm, wherein the first set of constants is used within a dequantization function to generate the first block of transform coefficients from the first block of quantized transform coefficients;
  calculate a second set of constants using a second mapping table, while applying the second dequantization algorithm, wherein the second set of constants is used within the dequantization function to generate the first block of transform coefficients from the first block of quantized transform coefficients.

18. The system of claim 16, wherein the dequantizer block is further configured to:
  calculate a first set of constants using a first mapping table, while applying the first dequantization algorithm, wherein the first set of constants is used within a dequantization function to generate the first block of transform coefficients from the first block of quantized transform coefficients;
  calculate a second set of constants using a shifted first mapping table, while applying the second dequantization algorithm, wherein the second set of constants is used within the dequantization function to generate the first block of transform coefficients from the first block of quantized transform coefficients.

19. The system of claim 16 further comprising:
an encoder having a quantizer block that is configured to:
  receive a second W×H block of transform coefficients generated from a second picture, wherein W is a row width of the second block of transform coefficients and H is a column height of the second block of transform coefficients;
  apply quantization processing to the second block of transform coefficients to generate a second block of quantized transform coefficients used to generate a bit sequence, which is used to reconstruct the second picture, wherein the quantization processing comprises applying a first quantization algorithm when the output M of the function M=log$_2$($\sqrt{W \cdot H}$) is equal to the integer value, and applying a second quantization algorithm when the output M is equal to the non-integer value.

20. The system of claim 16, wherein the decoder is configured to operate in conformance with a High Efficiency Video Coding Standard.

* * * * *

UNITED STATES PATENT AND TRADEMARK OFFICE
CERTIFICATE OF CORRECTION

Page 1 of 1

PATENT NO. : 8,958,472 B2
APPLICATION NO. : 13/607225
DATED : February 17, 2015
INVENTOR(S) : Wei-Ying Kung et al.

It is certified that error appears in the above-identified patent and that said Letters Patent is hereby corrected as shown below:

In the Claims

Claim 6 should read:

"6. The method of claim 5, wherein: The first mapping table comprises IQ=g1(QP%6), wherein g1 (x=0,1,2,3,4,5)={40,45,51,57,64,72}; and the second mapping table comprises IQ=g2(QP%6), wherein g2 (x=0,1,2,3,4,5)={56,63,72,80,90,101}."

Claim 7 should read:

"7. The method of claim 3, wherein: The first mapping table comprises IQ=g(QP%6), wherein g(x=0,1,2,3,4,5)={40,45,51,57,64,72}; and the shifted first mapping table comprises IQ=g((QP+3)%6), wherein g(x=0,1,2,3,4,5)={40,45,51,57,64,72}, and wherein QP is a decoded quantization parameter."

Signed and Sealed this
Ninth Day of June, 2015

Michelle K. Lee
*Director of the United States Patent and Trademark Office*